United States Patent [19]

Zitko et al.

[11] 4,043,258
[45] Aug. 23, 1977

[54] LOUVER LINKAGE SEAL

[75] Inventors: Ronald F. Zitko; James R. Adams, both of Downers Grove, Ill.

[73] Assignee: International Harvester Company, Chicago, Ill.

[21] Appl. No.: 715,789

[22] Filed: Aug. 19, 1976

[51] Int. Cl.² .............................................. F24F 13/08
[52] U.S. Cl. .................................... 98/121 A; 49/91; 137/601
[58] Field of Search ............... 98/40 VM, 121 A, 110; 49/91, 92; 137/601

[56] References Cited

U.S. PATENT DOCUMENTS

| | | | |
|---|---|---|---|
| 2,394,059 | 2/1946 | Hite | 49/91 |
| 2,890,503 | 6/1959 | Paine | 49/91 |
| 3,202,082 | 8/1965 | Viehmann | 98/110 |
| 3,205,541 | 9/1965 | Beards | 49/91 |
| 3,591,980 | 7/1971 | Cheng | 49/92 |

Primary Examiner—Ronald C. Capossela
Attorney, Agent, or Firm—Floyd B. Harman; Douglas W. Rudy

[57] ABSTRACT

A plurality of linkage seals are provided in an air distribution vent having a plurality of movable louvers for directing an air stream. A common linkage connects the louvers together for simultaneous adjustment. The linkage seals prevent foreign matter inclusion from adversely effecting the smooth operation of the louvered linkage.

1 Claim, 4 Drawing Figures

U.S. Patent  Aug. 23, 1977  4,043,258
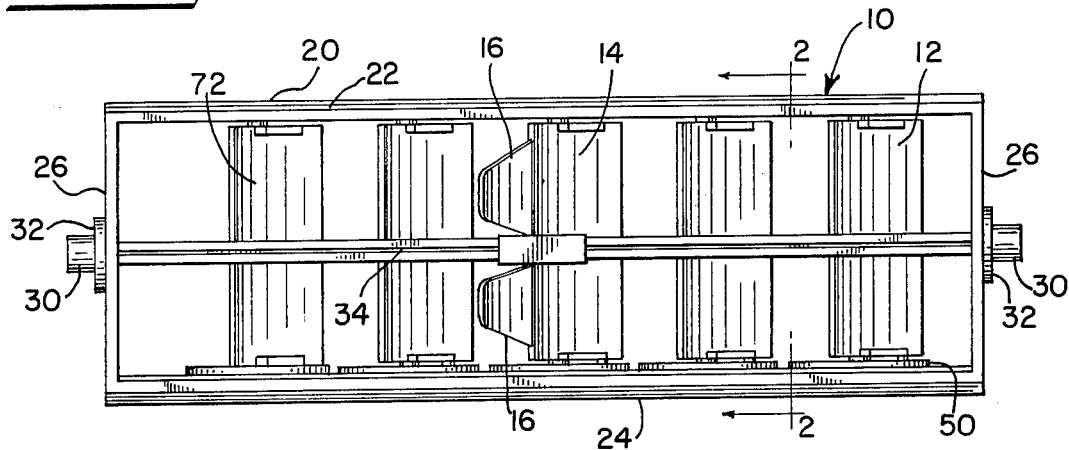
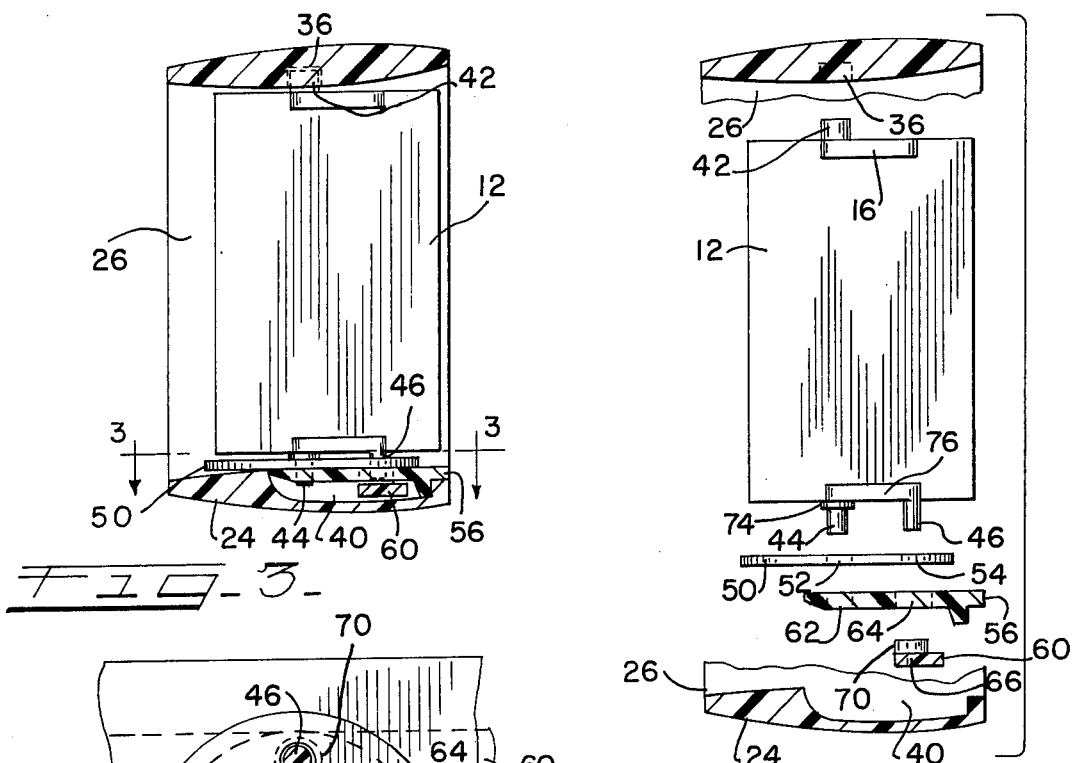
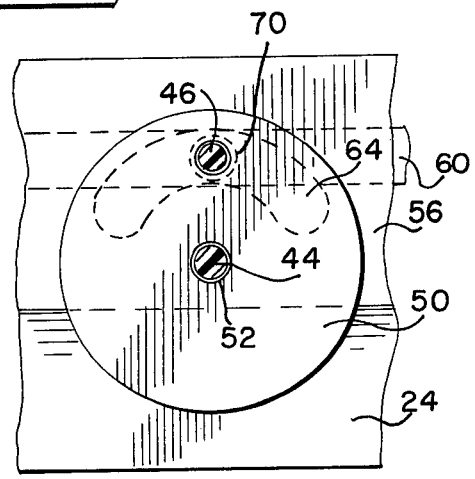

LOUVER LINKAGE SEAL

BACKGROUND OF THE INVENTION

The present invention relates to air directing vents having adjustable louvers as used in an air conditioning delivery system commonly found in automobiles, trucks, tractors and other vehicles. Specifically germain to this invention are air vents having a plurality of adjustable louvers on a common linkage means that allows each louver of this system to be operated conjunctively with each other louver.

The instant invention finds its most obvious use as the air vent in an agricultural tractor or other earth-working equipment. In this environment the host vehicle is frequently exposed to extremely dusty conditions. This dust as well as other foreign material will rapidly disrupt the operation of the louver linkage resulting in rapid wear. In extremely adverse environments dust accumulation will build up to a degree where operation of the adjustable louvers becomes impossible. Forced operation of a jammed air vent will frequently result in unintentional damage to the mechanism of the structure.

The louvered linkage seal of this invention minimizes the possibility of dust or other foreign material getting into the louver operating mechanism by providing a cover plate to act as a barrier above the linkage guide apertures or adjustable air duct delivery portals.

SUMMARY OF THE INVENTION

An adjustable air distribution vent having a number of adjustable louvers each connected to a common linkage bar is provided. The individual louvers pivot on upper and lower stub axles and are rotated through the displacement of an offset linking rod projecting into the common linkage bar. A retaining cover having a linkage guide for each louver maintains and guides the linkage bar in the peripheral frame of the vent. A dust excluding louver link seal prevents the entry of foreign matter into the operating zone of the linkage bar. This seal thus prevents unnecessary wear due to abrasive particulates that may result in the premature distruction of the adjustable air distribution vent.

It is one of the objects of this invention to provide the means to exclude foreign particulate matter from getting into the operating mechanism of an air distribution vent.

A further advantage of this invention is that the louver link seal may be retrofitted to existing distribution vents.

Another advantage is that the louver link seal is inexpensive to manufacture and install while being exemplarily effective for its intended purpose.

BRIEF DESCRIPTION OF THE DRAWINGS

These and other objects, advantages, and embodiments of the instant invention will be better understood upon perusal of following figures in which:

FIG. 1 presents a front elevation view of an adjustable air distribution vent;

FIG. 2 is a side elevation view taken through plane 2—2 of FIG. 1;

FIG. 3 is a broken away portion of the air distribution vent through plane 3—3 of FIG. 2 rotated 90° counterclockwise;

FIG. 4 is an assembly presentation clearly showing the components of the air distribution vent in elevation.

DETAILED DESCRIPTION OF THE INVENTION

Turning now to the figures for a detail description of a single embodiment of the invention and looking first at FIG. 1.

The adjustable air distribution vent, generally 10, is shown where the louvers, one designated as 12, have been rotated to allow the partial passage of air through the air vent toward the left. Each louver 12 is connected together such that movement of the control louver 14 through means provided by the tabs 16 results in equivalent movement of all the louvers.

The louvers 12 are retained in a peripheral frame 20 having a top portion 22, a bottom portion 24, and end portions 26. Each end portion 26 is equipped with an appendage 30 which may be accommodated in a frame (not shown) allowing the air vent 10 to be rotatably adjusted around the lateral axial center line of the device. Friction inducing washers 32 (in this embodiment of synthetic elastomer) are positioned on each appendage 30 outboard of the end portions to limit the control movement between the air vent and the frame (not shown).

A decorative barrier bar 34 may be positioned across the front of the air vent to minimize damage from accidental frontal blows that may otherwise cause damage to the louvers.

The operation of this air vent embodiment can be best seen by looking at all the figures collectively in which like reference characters indicate like parts.

It should be noted that the top portion 22 is equipped with blind holes or recesses 36 and the bottom portion 24 is equipped with a trough 40 transversing the bottom portion. The end portion 26 of the peripheral frame is seen in FIGS. 2 and 3 (partial).

The louver 12 which is basically an air deflecting surface or plane is shown to have an upper stub axle 42 and a lower stub axle 44 in the same vertical plane. The stub axles 42 are carried in the blind holes 36. The louver 12 is further equipped with a linking rod 46 offset from the vertical axial center of the stub axles 42 and 44.

The louver link seal 50 in this preferred embodiment is a plastic disk having a central aperture 52 and an outboard aperture 54 for accommodating the lower stub axle 44 and the linking rod 46 respectively. The link seal 50 could be of any configuration that would serve the purpose of this invention and of course choice of material is free and interchangeable.

A retaining cover 56 is a press fit into the transverse trough 40 trapping a linkage bar 60 in the trough. The retaining cover 56 is equipped with two apertures per louver. A circular aperture 62 (FIG. 4) accommodates the lower stub axle 44 while a kidney or arcuate shaped aperture or arcuate linkage guide 64 accommodates arcuate movement of the linking rod 46.

The linkage bar 60 is a long component having a plurality of linking rod apertures 66 to accommodate the linking rod of each louver 12. The linking rod apertures 66 are centered in linkage guide protrusions 70 which are cylindrical bumps having diameters approaching the width of the arcuate linkage guides 64 of the retaining cover 56. These linkage guide protrusions serve as guides to control the smooth uniform movement of the louvers as they are adjusted. Basically the linkage bar 60 transmits motion from the pilot or control louver 14 to each of the other louvers through its attachment to each linking rod 46. The trough 40 retains the linkage bar 60 but does not restrain it from transverse movement.

The improvement taught by this disclosure is the use of the lower link seal 50 to block the entry of foreign material such as dust from accumulating in the trough 40. In previous devices this objectionable material could enter through the arcuate linkage guides 64 best seen as a broken line in FIG. 3. The link seal, or alternatively the dust seal or disk 50 is close fitting both over the aperture 64 and around the stub axle 44 and linking rod 46. This prevents the entry of most dirt particles.

Although the louver link seal 50 and the louvers 12 are shown in this preferred embodiment it is also expected that the two could be combined and molded or formed as a single piece. This would be advantageous as one less piece would be necessary to make up the air vent assembly. In order to illustrate this possibility the louver at the left in FIG. 1 having the reference character 72 incorporates this one piece structure as an alternative embodiment. The shoulder 74 (FIG. 4) of the lower stub axle is deleted in this alternative embodiment, however, its use is a matter of design preference. (For instance, in order to preserve the interchangeability of one and two part molds and replacement part dimension uniformly).

It should be noted that the actual detail of the air vent is not critical to the function of the instant invention. The structure as illustrated could be drastically altered in many areas and still be within the intended scope of the appended claims. For instance the convex cross sections of the top and bottom portions of the peripheral frame is not mandatory to this invention. Likewise reinforcing appendages such as 76 are optional.

The intent of this invention is to provide a barrier to prevent the entry of dust and other foreign material into the operating mechanism responsible for smooth uniform simultaneous motion between the louvers.

Thus, it is apparent that there has been provided in accordance with the invention a louvered linkage seal that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An adjustable air distribution vent for use in directing a stream of air comprising:

a peripheral frame comprising a top portion, a bottom portion, and a pair of end wall portions, the top portion being provided with a plurality of blind holes opening towards the bottom portion and the botom portion equipped with a transverse trough opening towards the top portion of the peripheral frame;

a plurality of louvers having a protruding upper stub axle at the top portion thereof capable of being received by the blind holes of the top portion of the peripheral frame and a protruding lower stub axle at the lower portion thereof on the vertical axis in line with the upper stub axle, the louver further equipped with a linking rod offset from the vertical axis of the upper and lower stub axles;

a retaining cover having a plurality of circular apertures and a plurality of arcuate linkage guides, the circular apertures accommodating the lower stub axles of the louvers, the retaining cover bridging the transverse trough of the bottom portion of the peripheral frame;

a linkage bar residing a transverse trough below the retaining cover with a plurality of linking rod apertures and a plurality of linkage guide protrusions concentric with the linking rod apertures protruding into the arcuate linkage guides, the linking rod apertures accommodating the linking rod of the louvers;

a louver linkage seal having a pair of apertures therein including a central aperture accommodating the lower stub axle and an outboard aperture accommodating the linking rod of the louver whereby the arcuate linkage guides are covered preventing the passage of foreign material into the transverse trough of the bottom portion of the peripheral frame.

* * * * *